3,476,628
METHOD OF PREPARING SURFACED PANELS
Johannes Meinhardt and Paul Schubert, Munich, Germany, assignors to Frederick W. Cronin, Portland, Oreg.
Filed July 15, 1966, Ser. No. 565,599
Int. Cl. B32b 31/12, 15/20
U.S. Cl. 156—246
3 Claims

ABSTRACT OF THE DISCLOSURE

A method of surfacing panels and like articles where a gel layer is prepared on a supporting surface, an open mold frame is placed on the gel layer, and a preformed structurally integrated web bearing a decorative pattern is then arranged within the mold frame with such web against the gel layer. The panel to be surfaced is positioned over the web, the mold frame is filled with additional resin and with advancement of the resin to a hardened state, an integrated panel unit is prepared.

---

Figure 1:
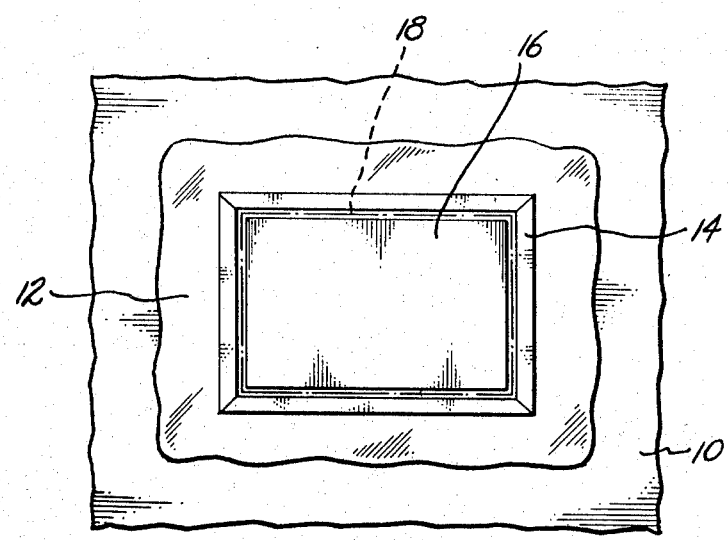

This invention relates to the surfacing of panels and like articles, wherein an attractive, wear resistant, infusible resin covering may be produced over a face of a panel.

As contemplated herein, a decorative pattern borne on a structurally integrated web such as paper, as for example, scenic photographs, maps, or other printed designs of substantially every description, may be incorporated with the panel covering to become an integral part thereof. In the final article the decorative pattern borne by the web is covered by a protective layer of clear resin, and backing up the web bearing the decorative pattern may be a layer of resin containing an opaque pigment which layer serves to add a pleasing contrast in the final article. The panel itself may be enveloped around its edges and over the back thereof with infusible resin whereby the panel is completely obscured. Panels prepared as contemplated, by reason of their decorative qualities, lend themselves to wall mounting, functioning as a table top or coaster, and other uses.

A general object of this invention is to provide a novel method for preparing such surfaced panels, which is relatively easily carried out, with the production of decorative panels of consistently good quality.

More specifically, this invention features as an object thereof the provision of a method with a novel procedure for incorporating a structurally integrated web bearing a decorative pattern, such as a photograph or other print, into the surfacing for a panel. Using the method contemplated, the pattern borne by the web is clearly visible on the outside of the coated panel, and an infusible, clear resin film, free of blemishes and of uniform thickness and surface finish, overlies and serves to protect the web which bears the pattern.

In a specific embodiment of the invention, it is contemplated that an opaque resin layer, forming an integral part of the surfacing for the panel, be incorporated beneath the web, and that the web as incorporated into the panel have a degree of transparency of perviousness to light, whereby this backing of opaque material provides a pleasing contrast for the pattern borne by the web.

Yet another object of the invention is the provision of a method for preparing such an article which enables the surface finish of a supporting surface to be imparted to the coating prepared over a panel.

Another object comprises the provision of a method which enables the coating of several panels to be carried on simultaneously, using a common supporting surface which determines the surface finish of each of the various panels coated.

A still further object comprises the provision of a method for coating a panel wherein a layer of thermosetting resin in the form of a soft gell is initially prepared (this layer in the completed panel forming the outer part of the coated panel), such soft gell layer during the manufacturing process serving to protect a supporting surface which lies underneath and supports the panel while the coating process is being carried out.

Figure 2:
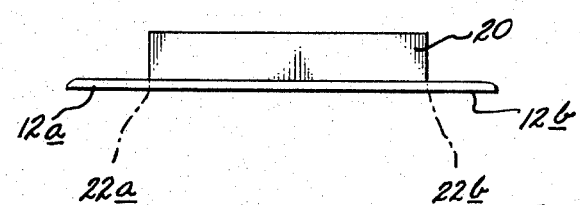

These and other objects and advantages of the invention will become more fully apparent as the following description is read in conjunction with the accompanying drawings, wherein:

FIG. 1 illustrates portions of a lay-up table having a thin layer of a thermosetting resin in a form of a soft gell extending thereover, and showing a mold frame supported on said resin layer as contemplated when carrying out the process of the invention; and FIG. 2 is a side elevation showing a resin or plastic coated panel as prepared by the invention immediately prior to the trimming of certain plastic excesses therefrom to produce the final product.

The coating process of the invention is carried out using liquid thermosetting polyester resins, which are converted as induced by a suitable catalyst and by the application of heat to a solid and infusible condition. Commonly, these resins are solutions of unsaturated polyesters in reactive monomers, such as styrene or diallyl phthalate. The polyesters are obtained from an unsaturated dibasic acid or anhydride, by reaction with a dihydric alcohol. Thus, as contemplated herein, a polyester is employable for preparing the panels of this invention which is the reaction product of maleic anhydride and diethylene glycol, these representing typical materials used in the preparation of such unsaturated polyesters. The polyesters are linear in structure, with recurring maleic double bonds, and the monomer (styrene or diallyl phthalate) co-reacts with the reactive double bonds to give cross linking of the linear chains.

While a specific polyester resin has been described, it should be understood that such has been done for purposes of illustrations only, and that other resins can be employed, by the substitution for the maleic anhydride of other dibasic anhydrides or acids such as phthalic anhydride, and by the use of different dihydric alcohols, such as propylene glycol, ethylene glycol, etc.

The monomer content of the liquid resins as utilized herein was maintained within the range of about 30–35%, on a weight basis. It should be understood, however, that this specific proportion may be varied where variations in the final properties and curing times are desired.

Solutions of unsaturated polyester in a reactive monomer, such as styrene, are relatively stable if maintained at normal room temperature. Curing of the resin is brought about by the addition thereto of a catalyst, which initiates the cross linkage reaction, and the usual catalysts which are employed comprises the organic peroxides and hydroperoxides. Exemplary of such peroxides as may be employed in this invention are benzoyl peroxide, cumene hydroperoxide, and methyl ethyl ketone peroxide, and the hydroperoxide ditertiary butyl hydroperoxide. In preparing the panels described herein to illustrate the invention, a 60% solution of methyl ethyl ketone peroxide was employed in dimethyl phthalate. This catalyst gave good cures at reasonably low temperatures, i.e. temperatures ranging from about 100°–150° F.

It is preferable also in carrying out the invention to employ a promoter in combination with the catalyst, to activate the catalyst and to develop cure at an accelerated rate at low temperature. A common promoter employed with the peroxide indicated is cobalt naphthenate, and a commercial solution of such material usually contains 6% cobalt metal. In preparing the polyester solutions of the invention, commonly from 0.66% to 0.3% of such cobalt solution based on the resin is employed, which is equivalent to a range of 0.004 to 0.18% cobalt.

In general terms, panels are coated as contemplated herein by first preparing on a supporting surface a layer of thermosetting resin as a soft gell. This layer in the completed panel forms the exterior of the coating prepared, and the face of the completed panel contains a surface texture which corresponds to the texture of the supporting surface upon which the layer of gell is prepared. A preformed structural web impregnated with liquid resin, such as a paper sheet, bearing the decorative pattern which is to be seen from the face of the panel (which may be a print or other design), is placed face down on the layer of gell. A shallow open mold frame is placed over the top of the layers of gell which bounds an area completely encompassing the margins of the paper sheet or web which previously was placed face down on the gell layer. Within the confines of this mold frame it is preferred that a liquid resin layer containing a pigment, such as titanium dioxide, next be prepared, which layer is opaque and being opaque serves to back up the structural web and the decorative configuration that it contains (the web tending to be made transparent by the impregnation of the web with resin). The board or other panel which is to be coated is then placed on top of the pigmented resin layer within the confines of the mold frame, there being a clearance between the edges of this panel and the interior of the mold frame and additional liquid resin added to envelop completely the perimeter of such panel and to cover the back or upper face thereof. On final hardening of the gell layer and the resin additions to the interior of the mold frame, the mold frame is removed, and the assembly comprising the resin mass and panel placed within the mold frame together with the now hardened gell layer removed from the supporting base. Trimming is done around each panel to remove excesses of resin formerly constituting the gell layer which extend beyond the resin mass shaped by the mold frame, thus to leave a completed panel unit with smooth edges and a shape corresponding to the interior of the mold frame.

As the supporting base, it is contemplated that a conductive plate, such as an anodized aluminum plate, be employed, which is heated to a temperature of between 110°–130° F. The anodized aluminum plate has a surface texture which is not absolutely smooth, and the plate comparts a pleasing slightly mat texture to the surface of the gell coat or layer initially prepared (which forms the outer surface of the final panel unit). The plate, being conducted and above room temperature, provides the heat which accelerates the cure of the resin additions applied thereover.

A particular feature of this invention is the spreading on this aluminum plate an expanse of resin forming the gell layer which covers a substantial area sufficient usually to provide an exterior film for several panels. The gell layer is prepared, it will be noted, before the mold frames are laid down, and with the mold frames in place the gell layer extends outwardly to all sides of each mold frame. This enables a gell layer of substantially uniform thickness through its entire expanse easily to be prepared. Furthermore, any excesses of resin in the gell layer serve as a protective covering on the aluminum plate preventing the same from being damaged, as for example, from being scratched when the open mold frames are placed in position.

Describing now the preparation of a specific panel, a conductive plate of anodized aluminum was heated to a temperature of approximately 120° F. With the plate maintained at this temperature, a gell coat was prepared of approximately $\frac{1}{32}''$ thickness, by brushing liquid maleic anhydride, diethylene glycol polyester resin containing about 0.5% methyl ethyl ketone peroxide catalyst and 0.16% cobalt over the plate. Prior to applying the liquid resin to the plate, the surface of the plate was sprayed with silicone to inhibit sticking. After about 10–15 minutes, the resin was noted to transform into a soft gell.

A colored photograph, and a paper sheet having a map printed over one face, each of these articles being broadly referred to herein as a "preformed structurally integrated web," were then placed face down on top of the gell coat, over spaced apart areas of the coat. These webs prior to being placed were fully impregnated with liquid polyester resin free of catalyst, by soaking the webs in such a resin for a period of about six hours. The soaking process had the effect of making the webs somewhat transparent in areas devoid of coloration or pigment. Immediately prior to placing the webs on the gell coat, their faces were brushed with polyester resin containing catalyst and promoter, and so also was the exposed upper surface of the gell coat. After placement of the webs on the gell coat, a paper backing was placed over the back or upper faces of each web, and pressure applied using a soft roller, to produce intimate contact between the webs and gell coat.

After such pressure treatment the paper backing was removed, and the exposed upper faces of the webs brushed with additional resin containing catalyst and promoter. A shallow open mold frame was then placed about each web, with the web centered within the interior of the mold frame, and with the mold frame resting on the gell coat.

In FIG. 1, one of such mold frame and web assemblies, as so far described, is illustrated. Thus, shown at 10 is portions of the conductive plate. A portion of the gell coat that is prepared on the plate is shown at 12. Indicated at 16 is a structurally integrated web or paper sheet, having a rectangular outline, and bearing a decorative pattern on the bottom face thereof. At 14 there is indicated a shallow open mold frame which, in this instance, is rectangular in shape, and bounds an area somewhat larger than the rectangular web which the frame encompasses.

With the frame in place, a layer of liquid resin containing pigment, such as white titanium dioxide, as well as catalyst and promoter, was brushed on the back of the web. Sufficient titanium dioxide was included in the resin to render the same opaque. The layer of resin prepared was approximately as thick as the gell coat. With such resin brushed so as to cover the entire area encompassed within the mold frame, additional pigmented resin was poured within the confines of the mold frame.

Rectangular panels to be coated by the process of the invention were then selected, having outer dimensions somewhat less than the inner dimensions of the mold frames. In FIG. 1 the outline of such a panel is shown by the dashed outline 18, and it will be noted that such is rectangular and has length and width dimensions which are slightly less than the inner dimensions of frame 14. A panel was placed within each mold frame, and pressed downwardly on the plastic mass below it. This resulted in some resin flowing up around the edges of the panel between the panel and the sides of the frame. After having so positioned the panels, additional pigmented liquid resin was poured over the back face of the panel, whereby the panel became completely enveloped by resin. The resin was leveled off at the top of the frame, and the resin in the entire assembly allowed to cure by advancing to a solid infusible state.

The resin masses shaped by the mold frames and the now hardened gell coat connecting them were next removed from conductive plate 10. With removal of the mold frames, resin masses were left shaped as the interior of the mold frames, each having a panel embedded therein. A side elevation of such a mass is shown in FIG. 2 at 20. Excesses of resin forming the original gell coat, which extended outwardly from the boundaries of each mass shaped by a mold frame, as at 12a and 12b in FIG. 2, were trimmed off flush with the edges of the formed masses, as at 22a, 22b, to produce completed panel units having dimensions corresponding to the inner dimensions of the mold frame.

The completed panel units over their front faces had a clear, hard plastic outer layer forming part of the original gell coat, which layer had a surface texture corresponding to the texture of the aluminum plate used in the preparation of the panels. Clearly visible through this transparent layer was the decorative pattern borne by the structurally integrated webs used in the panel preparation. The opacity produced by the addition of the pigment served as a background for the patterns borne by the webs. Each panel had the appearance of an integral unit, somewhat resembling alabaster in composition.

Of particular importance in obtaining an even distribution of clear plastic as the outer layer in a panel unit is the initial preparation of a gell coat which extends in a wide expanse over the conductive plate, which expanse covers a greater area than area taken up by a mold frame. In this way the liquid resin which forms the gell coat may be spread out smoothly, with the mold frame when applied over the gell coat then delineating a portion of the gell coat which has essentially uniform thickness throughout, and is devoid of accumulations of resin adjacent corners and edges of the mold frame. Further, as already indicated, by preparing such a wide expanse of the gell coat, when the mold frame is placed over the gell coat, the gell coat protects the conductive plate.

The process contemplated permits several panels to be surfaced at once, from a common gell coat. Resin masses enveloping each panel are readily broken apart after solidification of the gell coat.

While there has been described an embodiment of the invention, variations are possible. It is desired not to be limited to the specific embodiments disclosed, but to cover all such modifications and variations as would be apparent to those skilled in the art.

It is claimed and desired to secure by Letters Patent:
1. A method of surfacing panels and like articles comprising preparing on a supporting surface a gel layer comprising thermosetting resin in the form of a soft gel, placing an open mold frame on said gel layer with such resting on the gel layer, arranging a preformed structurally integrated web bearing a decorative pattern and impregnated with liquid thermosetting resin over said gel layer with such within and encompassed by said mold frame, consolidating the web and the gel layer whereby they come into intimate contact, positioning the panel to be surfaced over the impregnated web and within the open mold frame, and by final curing of the resin in the gel layer and web to advance such resin to a hardened state producing an integrated panel unit of the gel layer, web and panel.

2. The method of claim 1, wherein the arranging of the impregnated web over the gel layer includes the step of applying a film of liquid thermosetting resin to a face of the web immediately prior to placing it on the gel layer and then placing the web on the gel layer with such face facing the gel layer.

3. The method of claim 1, which further comprises removing the mold frame after advancement of the resin to a hardened state, and then trimming excess portions of the now hardened gel layer which extend beyond the edges of the resin mass shaped by the mold frame to produce a final panel with boundaries corresponding to the interior of the mold frame.

References Cited

UNITED STATES PATENTS

| | | | |
|---|---|---|---|
| 2,646,380 | 7/1953 | Barlow et al. | 156—245 X |
| 2,817,619 | 12/1957 | Bickel et al. | 156—245 X |
| 3,062,604 | 11/1962 | Hodgen | 161—6 |
| 3,072,973 | 1/1963 | Barnette | 264—247 |
| 3,384,522 | 5/1968 | Rubenstein | 156—242 |

HAROLD ANSHER, Primary Examiner

T. R. SAVOIE, Assistant Examiner

U.S. Cl. X.R.

156—267; 161—6, 41